United States Patent [19]

Korpman

[11] 4,431,598
[45] Feb. 14, 1984

[54] PROCESS FOR EXTRUDING ADHESIVE FILMS AND TAPES

[75] Inventor: Ralf Korpman, Bridgewater, N.J.

[73] Assignee: Permacel, New Brunswick, N.J.

[21] Appl. No.: 333,203

[22] Filed: Dec. 21, 1981

Related U.S. Application Data

[63] Continuation of Ser. No. 124,392, Feb. 25, 1980, abandoned.

[51] Int. Cl.³ .......................... B29D 7/00; B29F 3/08
[52] U.S. Cl. .............................................. 264/40.7
[58] Field of Search ............ 264/176 R, 40.7, 177 R; 100/43, 50, 93 S; 366/79, 144, 145, 146

[56] References Cited

U.S. PATENT DOCUMENTS

| | | | |
|---|---|---|---|
| 3,410,713 | 11/1968 | Schneider | 427/208.2 |
| 3,669,061 | 6/1972 | Zuideveld | 118/692 |
| 3,783,072 | 1/1974 | Korpman | 156/244.23 |
| 3,984,509 | 10/1976 | Korpman et al. | 264/40.1 |
| 4,004,412 | 1/1977 | Burnell | 60/39.28 R |
| 4,013,745 | 3/1977 | Brinkmann et al. | 264/37 |
| 4,171,193 | 10/1979 | Rahlfs | 264/40.7 |
| 4,178,337 | 12/1979 | Hall et al. | 264/176 R |

OTHER PUBLICATIONS

Modern Plastics, Mar. 1979, pp. 25–26.
Plastics Technology, 24(3), Mar. 1978, p. 11.

*Primary Examiner*—Willard E. Hoag
*Attorney, Agent, or Firm*—Dressler, Goldsmith, Shore, Sutker & Milnamow, Ltd.

[57] ABSTRACT

An improved process for preparing pressure-sensitive adhesive film and tape by extrusion of a relatively high molecular weight thermoplastic elastomer with a relatively low molecular weight tackifier resin is described. An apparatus suitable for carrying out the extrusion is also described.

2 Claims, 1 Drawing Figure

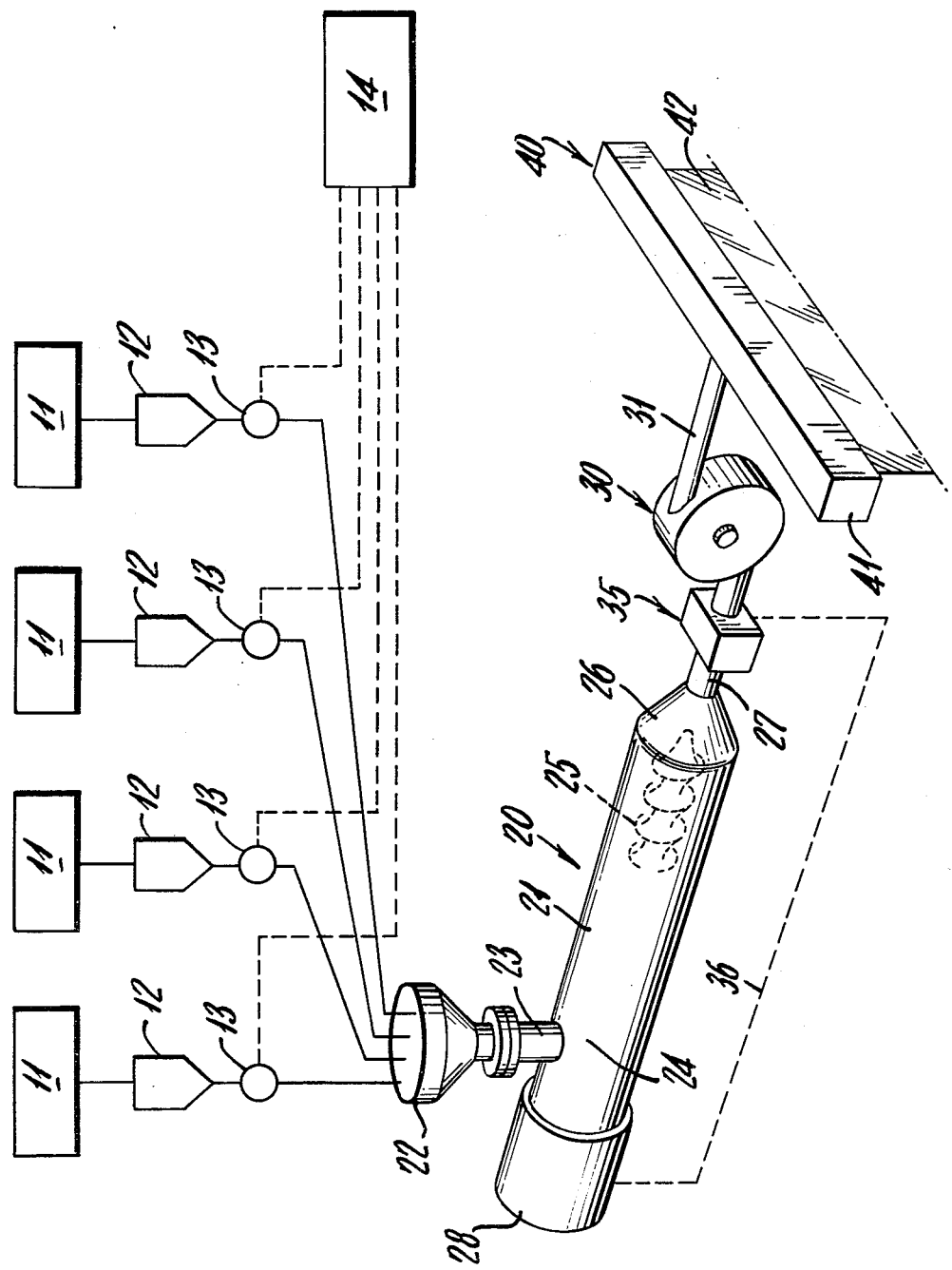

PROCESS FOR EXTRUDING ADHESIVE FILMS AND TAPES

This is a continuation of application Ser. No. 124,392, filed Feb. 25, 1980, now abandoned.

The present invention relates to films and tapes, particularly to an improved extrusion process for producing such films and tapes, and to an apparatus for carrying out the process.

Films of an elastomeric base, particularly pressure-sensitive adhesive films have usually been prepared by solvent coating because of the inherent difficulty in extruding high molecular weight elastomeric materials with a low molecular weight highly tacky material. In U.S. Pat. No. 3,783,072 there is described a process for producing normally tacky pressure-sensitive adhesives by employing careful control of extrusion temperature and viscosity. In this process, the control is aided by selecting from conventional plastics extrusion equipment, an extruder barrel with a large L/D ratio. In addition, control is effected within the prescribed range by heating the screw in the feed section and by carefully controlling the particulate size of the elastomer and tackifier resin pellets. While this process permitted realization of useful pressure-sensitive adhesive preparation by extrusion, in practice, difficulties were encountered during manufacture because of surging problems resulting in variations up to forty percent in the coating weight of the extruded film.

The surging problem, traceable to the agglomeration and sticking to the flights of the screw in the feed section of the extruder of a mixture of high molecular weight elastomer and low molecular weight tackifier resin particles, was overcome in part by a process employing a combination of starve-feeding and mechanical blocking means described in U.S. Pat. No. 3,984,509. In the process, the mixture is wiped or displaced from the flights with a wiper screw or mechanical blocking means positioned between the flights of the screw in the feed section of the extruder. While the use of this modified apparatus and process improves the accuracy in coating weights, variations as high as fifteen percent may be encountered.

While extrusion of highly viscous thermoplastic polymers such as nylon, polyester, polystyrene, low-density polyethylene, high-density polyethylene, polypropylene, polycarbonate and the like reportedly have been aided by use of positive displacement gear pumps, it is known that they are not useful when materials such as abrasives are added which alter flow properties. Elastomers have refractory flow characteristics and are especially intractable when combined with low molecular weight tackifier resins.

It is the object of the present invention to provide a process for producing a pressure-sensitive adhesive film of a predetermined coating weight with accuracy and consistency.

Another object of the present invention is to provide a process for producing film from or sheet highly tacky, highly viscous compositions with accuracy and consistency.

It is a further object of the present invention to provide a means for carrying out the above objects.

These and other objects will become apparent from the following specification, drawing and claims.

According to the present invention, it has been discovered that a surge-free extrusion of highly viscous, elastic, tacky and refractory materials into sheets and films can be achieved by a process which employs a modified extrusion assembly comprising an extruder, an elongated die, a positive displacement gear pump positioned between the extruder and die, a control system for maintaining constant pressure of the extrudate, said control system consisting of a pressure sensor, a loop relay and a variable speed motor driving the extruder screw. The sensor, mounted at the inlet of the pump, is responsive to the pressure of the molten mixture delivered from the extruder and transmits the pressure changes through the loop relay to the motor which controls the rotative speed of the extruder. The invention is particularly directed to a process for extruding a thermoplastic-elastomeric adhesive film or layer from a dry particulate mixture comprising relatively high molecular weight elastomer particles and relatively low molecular weight resin particles. The process comprises feeding a mixture of substantially dry particles into the inlet portion of an extruder into rotative and axial driving contact with the extruder screw, thoroughly mixing and melting the mixture in the extruder to cause it to become homogeneous, delivering the melted homogeneous mixture from the extruder to the inlet of the positive displacement pump under a pressure maintained substantially constant by the varying rotative speed of the extruder screw responding to control system and pumping the melted mixture under steady state pressure conditions through an elongated extrusion die to form a uniform thermoplastic-elastomer film or sheet.

The high quality of the ultimate thermoplastic-elastomeric adhesive film or sheet is made possible by the positive displacement gear pump positioned immediately before the die and exerting, substantially at the point of entry, a positive control over the rate of feeding of the molten material into the die. The smooth functioning of the pump is predicated on the sufficiency of the material supplied to the pump by the extruder. A continuous adequate supply of the molten mixture is achieved by the pressure control system. The sensor, on sensing a change of pressure, responds by generating a signal via a loop relay joined to a variable speed motor. The motor, on receiving the signal, responds by altering the rotative speed of the extruder screws. The rotative speed may be increased to increase the throughput of the molten mixture or decreased to decrease the throughput of the molten mixture to conform to a predetermined established pressure at the pump inlet. The established pressure is such to assure the presence of adequate extrudate for smooth extrusion of molten mixture through the die orifice.

The particular combination of particulate matter to which the process of this invention is directed especially is that of a relatively high molecular weight thermoplastic-elastomer which provides the adhesive base and a relatively low molecular weight tackifier resin. By "relatively high molecular weight" is meant a number average molecular weight of at least 75,000, preferably at least about 100,000. By "relatively low molecular weight" is meant a number average molecular weight not above about 3,000.

The thermoplastic-elastomer particles preferably are selected from one of the following: (1) a linear, branched or radial A-B-A block copolymer wherein the A blocks are thermoplastic and are derived from alkenylarenes and the B block is elastomeric and is derived from a conjugated diene or from ethylene and butylene; (2) an A-B block copolymer wherein the A block is thermoplastic and derived from an alkenylarene and the B block is elastomeric and derived from a conjugated diene or ethylene and butylene; (3) an ethylene vinyl acetate copolymer; and (4) a mixture of any of the copolymers from two or more of the categories (1), (2) or (3). Minor amounts of more conventional diene rubber elastomers such as natural rubber, synthetic rubbers based on butadiene, isoprene, butadiene-styrene, butadiene-acrylonitrile, butyl rubber, and other block copolymers based on diene rubber elastomers may be incorporated if they can be reduced to an extrudable condition.

The A-B-A block copolymers may be linear, branched or radial A-B-A block copolymers including those sometimes designated as A-B-C block polymers in which C is also a thermoplastic block but of a different polymer than A. The thermoplastic "A" block is generally a polymer of alkenylarenes, preferably of styrene or styrene homologs and analogs such as α-methylstyrene, 5-tertiary-butylstyrene, 4-methylstyrene, 3,5-diethylstyrene, 3,5-di-n-butylstyrene, vinyltoluene and the like. The rubbery "B" block is a polymer of a conjugated lower aliphatic diene of from 4 to about 6 carbon atoms or of a lower alkene of from 2 to about 6 carbon atoms. Suitable conjugated dienes include butadiene, isoprene, 1,3-pentadiene and the like. Suitable alkenes include ethylene, butylene, propylene and the like. The individual A blocks may have a number average molecular weight of at least about 7,000, preferably in the range of about 12,000 to 30,000 and the B block may have a number average molecular weight in the range of about 75,000 to 200,000. The total A blocks preferably constitute about five to fifty percent by weight of the block copolymer.

Suitable radial A-B-A block copolymers may be of the type described in U.S. Pat. No. 3,281,383 and may be represented by the formula (A-B—$_n$x, wherein A is a thermoplastic block as hereinbefore detailed and B is an elastomeric block as hereinbefore detailed, X is an organic or inorganic molecule with a functionality of 2 to 4 as described in U.S. Pat. No. 3,281,383 or with a higher functionality as described in the article entitled "New Rubber is Backed by Stars" appearing on page 35 of the June 11, 1975, issue of Chemical Week. The subscript n is a number corresponding to the functionality of X and therefore may be from two to four as described in the aforesaid patent or be as large as twenty-two as described in the above article.

The A-B block copolymers, sometimes known as simple block copolymers, are of the type where the thermoplastic A block forms one end block and the elastomeric B block forms the other end block. Representative A-B block copolymers are described in U.S. Pat. Nos. 3,519,585 and 3,787,531. Generally the A-B block copolymers are in the molecular weight range of the linear A-B-A block copolymers.

When the "A" block is polystyrene and the "B" block is a polymer of butadiene, the polymer may be referred to as an S-B-S or S-B polymer, and when the "A" block is a styrene polymer and the "B" block is an isoprene polymer, the polymer may be referred to as an S-I-S or S-I polymer. Many of the block copolymers are obtainable commercially.

The dry tackifier resin particles, the second component of the mixture to which the process of this invention is directed, may be hydrocarbon resin such as polymerized mixed olefin, esters of hydrogenated rosin, esters of stabilized rosin, polyterpene resin, phenolic resin, coumarone-indene, α-methylstyrene, and the like.

Other suitable resins are disclosed in column five of U.S. Pat. No. 3,239,478. The tackifier resin is generally selected from those having a melting point above about 60° C.

The tackifying resins which may be employed in the adhesive composition are represented by rosin, dehydrogenated rosin, rosin plus polyterpene resins, glycerol esters of hydrogenated rosins, pentaerythritol esters of hydrogenated rosin, coumarone-indene resins, hydrogenated rosin, glycerol esters of polymerized rosin, maleic anhydride-modified rosin and rosin derivatives, partial esters of styrene-maleic acid copolymers, chlorinated biphenols, oil soluble phenol-aldehyde resins, and the like.

In addition to the foregoing components, the basic mixture may contain relatively small quantities of various other materials such as anti-oxidants, heat stabilizers and ultraviolet absorbers, release agents and the like. Representative antioxidants are 2,5-ditertiary-amylhydroquinone and tertiary-butylcresol. Representative heat stabilizers are zinc salts of alkyl dithiocarbamates. Lecithin is a representative release material; waxes and various other release agents are also suitable. Particulate mixture may include minor amounts of fillers and pigments such as zinc oxide, aluminum hydrate, clay, calcium carbonate, titanium dioxide, carbon black and the like. Many of these fillers and pigments also may be used in powdered form as parting agents to be mixed with the thermoplastic-elastomer particles prior to blending the components to prevent them from agglomerating.

After extrusion, the film may be processed in any way known in the art. Since pressure-sensitive adhesives normally are coated on nontacky backing sheets, the process may be used for extruding a film of pressure-sensitive adhesive and then laminating the adhesive while hot onto a backing sheet which, in turn, may be paper, polymeric film, foil, or the like and may contain reinforcing strands or other materials, or may be laminated with several sheets or layers of the same or different materials. The film may also be in the form of a self-supporting film which is adhesive or non-adhesive.

Although the present invention is directed primarily to the extrusion of a substantially dry mixture comprising a relatively high molecular weight thermoplastic-elastomer and a relatively low molecular weight tackifier resin, the apparatus is adaptable to use in producing other non-adhesive self-supporting elastomeric films as well as plastic films from highly viscous thermoplastic compositions. Generally however with thermoplastics, a simple extrusion apparatus and process is sufficient. Films extruded by this process are primarily thin films, below about 20 mils in thickness where accuracy and consistency are essential.

These and other advantages of this invention will be apparent to one skilled in the art from the following description and claims taken together with the drawing designated FIG. 1 which is a combination of a flow diagram of materials preparation for extrusion with a view in elevation of an extrusion assembly employing a loop system for pressure control.

The flow diagram portion of FIG. 1 shows the preliminary steps in the preparation of the components to be extruded employing the extrusion assembly of the present invention. The components of the particulate mixture to be extruded are drawn from sources of supply or storage containers 11 into feed hoppers 12 from which they are metered through individually controlled feeding devices 13 to the receiving arm of the extrusion assembly. Various kinds of constant speed feeding devices such as conveyor belts may be employed between the hoppers 12 and the extruder 20. Preferably, gravimetric weight control devices are employed in conjunction with each of the hoppers to assure constant weight feeding. While the drawing shows four sources of supply or feeding units, the number may be more or less. Since the process and apparatus of this invention are directed to solving the problem encountered during extrusion of a high molecular weight elastomer with a low molecular weight tackifier resin, it is contemplated that there will be at least two feeding units, one for the elastomer and the other for the tackifier.

The extrusion assembly comprises an extruder 20, a die 40, a positive displacement gear pump 30 mounted between the extruder head 26 and the die, and a pressure control system comprising a sensor 35 positioned at or proximate to the inlet of the gear pump 30 and responsive to change in pressure of the molten extrudate, a loop relay 36 and a variable drive motor 28 driving the extruder screw 25.

The extruder may be any extruder normally employed in plastics and/or rubber technology. It may be a single screw extruder, a twin screw extruder, or a "wiper screw" extruder of the type described in U.S. Pat. No. 3,982,509.

The die contemplated for use in this process is one having an elongated slot suitable for film and sheet formation. The selection of slot length and slot width for the die is governed by the desired width and thickness of the film, and the viscoelastic properties of the extrudate, and is within the skill of the artisan. Since the pump exerts positive control over the feeding of the extrudate to the die, a die with adjustable slot variation is not a necessity but is within the option of the user.

The gear pump contemplated for this process is one having a large suction inlet and operating with counter rotating gears at speeds of from about 2 to 150 revolutions per minute. It is conveniently operated at up to 60 r.p.m. delivering up to approximately 3000 cubic centimeters of material per minute.

In the pressure control system, the sensor is a pressure gauge programmed to transmit a pressure value signal through a relay to a variable speed motor. The latter, readily available commercially, is programmed to adjust its speed in response to pressure change signals received by it.

In a preferred embodiment of the process of the present invention employing the apparatus of the present invention, the high molecular weight thermoplastic elastomer component, the low molecular weight tackifier resin component, and optional additives, if employed, are supplied by the feeding unit comprising storage containers 11, feed hoppers 12, and feeding devices 13 to the extrusion assembly at hopper 22 of extruder 20. The components at the hopper should have an air content of about 25 to about 75 percent. The mixture is passed through a cooled throat or inlet conduit 23 into the feed section 24 of the extruder where it comes into rotative and axial during contact with the helical flights or threads of a rotating screw 25. With the rotation of this screw, the mixture is turned into extruder barrel 21 and advanced axially forward in the barrel with the flights while being mixed and heated. The heating is accomplished primarily along the walls of the extruder. The screw is also heated at the feed section. Additional heat is generated by the extrusion process. Although the walls of the inlet portion of the extruder may be cooled to avoid premature melting of tackifier resin particles, the feed section 24 must be maintained at a temperature above the melting point of the low molecular weight component, generally at least 250° F. (121° C.) The temperature along the barrel generally is not above about 400° F. (205° C.), preferably between 300° F. (150° C.) and 350° F. (177° C.).

The hot viscous adhesive mixture is forced through the barrel by pressure created by rotation of the screw and is discharged from the extruder into conduit 27 at the extruder head 26, and thence to positive displacement gear pump 30 while passing through pressure sensor 35. The pump 30 pumps the molten mixture with positive control to elongated die 40 where it is extruded through die opening 41 in the form of film 42. The pressure of the molten mixture to the die is kept constant by the positive control effected by the pump. In order to assure that the pump can maintain accurate feeding to the die, the pressure of the extrudate delivered to the pump is monitored by a pressure sensor 35 mounted at the pump inlet or along the conduit 27 between extruder head 26 and pump 30. The sensor emits a signal through relay 36 to variable speed motor 28 which responds to the signal by increasing or decreasing the rotative speed of screw 25, thereby increasing or decreasing the flow and consequently the pressure of the extruder discharge.

The hot, tacky extruded film or curtain 42 which passes downwardly through the die opening may be contacted with a backing sheet passing over a driven laminating roller (not shown) positioned beneath the die in a conventional manner. The extruded film adheres to the backing as soon as it comes in contact with it. The tacky film may be stretched longitudinally by running the backing sheet over the laminating roller at a linear speed higher than the linear rate of extrusion of the film as is known in the art. The film may be laminated to the backing sheet to produce laminated sheets which may be cut into pressure-sensitive adhesive tapes. Alternatively, if a free film is desired, the backing sheet employed is one which has previously been coated with a release agent. In the latter case, the film after cooling may be separated from the backing sheet.

The following examples illustrate the invention but are not to be construed as limiting.

EXAMPLE I

A mixture of the following dry particles

|  | Parts by Weight |
|---|---|
| Kraton* 1107 | 107 |
| Amoco* Resin 18-210 | 50 |
| Zinc dibutyl dithiocarbamate | 2 |
| 2,5-Ditertiary-amylhydroquinone | 0.5 |

*Trademarks:
Kraton - Shell Chemical Co.
Amoco - Amoco Chemical Corp.

is fed into the inlet portion of an extruder maintained at a temperature of about 182° C. whereupon it comes into contact with the rotating extruder screw and is mixed in the extruder initially at about 204° C. and with temperature decreasing to about 177° C. as the mixture proceeds along the barrel, and then is discharged from the extruder. The discharged extrudate enters the positive displacement pump maintained at 182° C. and 3 r.p.m.

from which it is pumped at a rate of about 150 cc/minute to a die maintained at 182° C. and from which it is extruded as a thermoplastic elastomer film and recovered on a backing sheet. The film has a consistent thickness of about 5 mils.

The operation when repeated employing a twin screw extruder is found to produce similar good results.

EXAMPLES II-VII

In a manner similar to that described in EXAMPLE I, films are prepared from the following formulations using single screw extruder and extrusion assembly. All films may be extruded to have a consistent thickness of about 2 mils.

| Component | \multicolumn{6}{c}{Example Numbers} | | | | | |
|---|---|---|---|---|---|---|
| | II | III | IV | V | VI | VII |
| Kraton* 1107 (S-I-S linear) | | | | 100 | | |
| Kraton* 1102 (S-B-S linear) | 100 | | | | | |
| Solprene* 418 X (S-I-S radial) | | 100 | | | | |
| Solprene* 411 (S-B-S radial) | | | 100 | | | |
| Solprene* (S-I linear) | | | | | 100 | |
| EVA 105 (ethylene vinyl acetate copolymer) | | | | | | 100 |
| WingTack* 95 | | | | 80 | | |
| WingTack* 76 | 70 | | | | | |
| Piccolyte* 8115 | | 60 | | | | |
| Super Sta-Tac* 80 | | | 80 | | | |
| Cumar* 509 LX | | | | | 30 | |
| Foral* 105 | | | | | | 90 |
| Zinc dibutyl dithiocarbamate | 2 | 2 | 2 | 2 | 2 | 2 |
| 2,5-Ditertiary-amylhydroquinone | 0.5 | 0.5 | 0.5 | 0.5 | 0.5 | 0.5 |

*Trademarks:
Solprene - Phillips Petroleum Co.
WingTack - Goodyear Tire and Rubber Co.
Piccolyte and Foral - Hercules, Inc.
Cumar - Neville Chemical Co.
Sta-Tac - Reichhold Chemicals, Inc.

In the foregoing examples, Kraton 1107 is a thermoplastic elastomeric A-B-A (styrene-isoprene-styrene) block copolymer having a styrene content of about 12 to 15 percent and a number average molecular weight of about 110,000 to about 125,000. Kraton 1102 is a styrene-butadiene-styrene copolymer wherein the styrene blocks constitute about 30 percent of the copolymer and the number average molecular weight is about 125,000. All of these block copolymers are offered by Shell Chemical Company.

Solprene 411 is a radial styrene-butadiene-styrene block copolymer and contains approximately 30 percent styrene. Solprene 418X is a radial styrene-isoprene-styrene copolymer wherein the styrene blocks constitute about 15 percent of the copolymer. Solprene 1205 is a styrene-butadiene copolymer and Solprene 311 is a styrene-isoprene copolymer. Both of these latter copolymers have a styrene content of about 15 percent. The Solprene polymers are offered commercially by Phillips Petroleum Company.

EVA 105 is an ethylene vinyl acetate random copolymer comprising about 60 percent ethylene and 40 percent vinyl acetate available from E. I. DuPont de Nemours and Company.

WingTack 95 is a solid tackifier resin consisting predominantly of polymerized structure derived from piperylene and isoprene, with the ratio of piperylene to isoprene being at least about 8 or 9 to 1, and with the remainder of the polymerized structure being derived from monoolefins. This resin has a softening point of about 95° C. when measured by the ball and ring method and has a number average molecular weight of about 1100. WingTack 76 is a similar solid tackifier resin which has a softening point of about 76° C. Both are offered commercially by Goodyear Tire and Rubber Company.

Piccolyte S115 is a polyterpene tackifier resin having a softening point of about 115° C. offered by Hercules Chemical Company.

Super Sta-Tac 80 is a tackifier resin consisting of polymerized mixed olefins having a softening point of about 80° C. and is offered by Reichhold Chemicals, Inc.

Foral 105 is a tackifier resin of pentaerythritol ester of stabilized rosin with a melting point of 94° C. Cumar 509 LX is a coumarone-indene resin having a softening point of about 145° C. Both these resins are offered by Hercules Chemical Company.

Amoco Resin 18-210 is a solid poly($\alpha$-methylstyrene) with a softening point of about 210° C. offered by Amoco Chemical Company.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

I claim:

1. An extrusion process for obtaining a highly uniform, thin adhesive film of thickness no greater than 20 mils, from a dry mixtuire of particles comprising relatively high molecular weight thermoplastic elastomer particles having a number average molecular weight of at least 75,000 and relatively low molecular weight tackifier resin particles having a number average molecular weight not above about 3,000 which comprises:

(1) feeding the mixture into an extruder including a cooled inlet conduit, feed section and a rotating screw within a barrel, said mixture passing through the cooled inlet conduit into the feed section where said mixture advances into rotative and axial driving contact with said rotating extruder screw, said feed section maintained at a temperature above the melting point of the low molecular weight component by heating said screw and the walls of said extruder, (2) thoroughly mixing and melting the mixture in the extruder barrel to csuse it to become homogeneous, said extruder barrel being maintained at temperatures up to about 400° F. and having a varying rotative speed screw to prevent surging, (3) delivering the melted homogeneous mixture from the extruder to the inlet of a positive displacement gear pump under a pressure maintained substantially constant by the varying rotative speed of the extruder screw within the barrel, said screw speed responding to a control system comprising a sensor mounted at the inlet of the pump operably associated via a loop relay to a variable speed motor driving the extruder screw, and (4) pumping the melted mixture under steady-state pressure conditions through an elongated extrusion die to form a uniform, thin adhesive film; wherein in said process, the high molecular weight thermoplastic elastomer particle is selected from the group consisting of:
(a) a linear or radial A-B-A block copolymer wherein the A blocks are derived from an alkenylarene and the B block is derived from a conjugated diene or from ethylene and butylene,
(b) an A-B block copolymer wherein the A block is derived from alkenylarene and the B block is derived from a conjugated diene or from ethylene and butylene,
(c) an ethylene vinyl acetate copolymer, and
(d) a mixture of copolymers from two or more of the categories (a), (b), or (c) above.

2. A process according to claim 1 in which the elastomer particles may be modified by a minor amount based on the weight of the total elastomer particles by an elastomer selected from the group consisting of natural rubbers, synthetic rubbers based on butadiene, isoprene, styrene-butadiene and butadiene-acrylonitrile, butyl rubber and other block copolymers based on diene rubber elastomers.

* * * * *

UNITED STATES PATENT AND TRADEMARK OFFICE
CERTIFICATE OF CORRECTION

PATENT NO. : 4,431,598
DATED : February 14, 1984
INVENTOR(S) : Ralf Korpman

It is certified that error appears in the above-identified patent and that said Letters Patent is hereby corrected as shown below:

Column 3, line 36, "A-$B_n$x" should be --(A-B$)_n$-x--;

Column 5, line 61, "during" should be --driving--;

Column 7, line 30, "8115" should be --S115--;

Column 8, line 36, "mixtuire" should be --mixture--;

Column 8, line 53, "csuse" should be --cause--.

Signed and Sealed this

Fifteenth Day of April 1986

[SEAL]

Attest:

DONALD J. QUIGG

Attesting Officer     Commissioner of Patents and Trademarks